United States Patent
Yee et al.

(10) Patent No.: US 12,482,228 B2
(45) Date of Patent: Nov. 25, 2025

(54) TRAINING SYSTEM AND TRAINING METHOD FOR HUMAN-PRESENCE DETECTION MODEL

(71) Applicant: LITE-ON SINGAPORE PTE. LTD., Singapore (SG)

(72) Inventors: George Chun-Wei Yee, Singapore (SG); Wui-Pin Lee, Singapore (SG); Heng-Khai Ng, Singapore (SG)

(73) Assignee: LITE-ON SINGAPORE PTE. LTD., Singapore (SG)

( * ) Notice: Subject to any disclaimer, the term of this patent is extended or adjusted under 35 U.S.C. 154(b) by 428 days.

(21) Appl. No.: 18/322,554

(22) Filed: May 23, 2023

(65) Prior Publication Data

US 2024/0257495 A1  Aug. 1, 2024

(30) Foreign Application Priority Data

Feb. 1, 2023 (CN) .......................... 202310119072.7

(51) Int. Cl.
*G06V 10/762* (2022.01)
*G06V 10/771* (2022.01)

(52) U.S. Cl.
CPC .......... *G06V 10/763* (2022.01); *G06V 10/771* (2022.01)

(58) Field of Classification Search
CPC .... G06V 10/763; G06V 10/771; G06V 10/82; G06V 10/762; G06V 40/10; G06N 20/00
See application file for complete search history.

(56) References Cited

U.S. PATENT DOCUMENTS

| | | | | |
|---|---|---|---|---|
| 5,877,688 | A * | 3/1999 | Morinaka | G06V 40/10 374/45 |
| 6,650,322 | B2 * | 11/2003 | Dai | G06F 1/3203 345/212 |
| 2017/0323155 | A1* | 11/2017 | Biswas | G01S 15/86 |
| 2021/0109486 | A1* | 4/2021 | Hamlin | G05B 13/0265 |

FOREIGN PATENT DOCUMENTS

| | | |
|---|---|---|
| JP | 2005156424 A | 6/2005 |
| JP | 2015105923 A | 6/2015 |
| TW | 202022648 A | 6/2020 |
| TW | I778872 B | 9/2022 |

* cited by examiner

*Primary Examiner* — Sumati Lefkowitz
*Assistant Examiner* — Anna Lei
(74) *Attorney, Agent, or Firm* — Li & Cai Intellectual Property Office

(57) ABSTRACT

A training system and a training method for a human-presence detection model are provided. The training method includes: obtaining, by a distance sensor and a temperature sensor, a plurality of training samples; dividing the plurality of training samples into a first data cluster and a second data cluster according to whether or not an input interface of the host device is in a used state; marking the first data cluster as a human-presence cluster; selecting a sub-cluster from the second data cluster; marking the sub-cluster as a human-absence cluster; and performing machine learning for the human-presence cluster and the human-absence cluster to generate the human-presence detection model. The first data cluster corresponds to the used state. A center point of the sub-cluster corresponds to a maximum distance value and a minimum temperature value.

10 Claims, 17 Drawing Sheets

TRAINING SYSTEM AND TRAINING METHOD FOR HUMAN-PRESENCE DETECTION MODEL

CROSS-REFERENCE TO RELATED PATENT APPLICATION

This application claims the benefit of priority to the China Patent Application Ser. No. 202310119072.7, filed on Feb. 1, 2023, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a machine learning technology, and more particularly to a machine learning technology for detecting a presence of a human.

BACKGROUND OF THE DISCLOSURE

Using image data obtained through a photographic lens installed on a computer, a distance between an object under test and a computer can be accurately determined, as well as whether or not the object under test matches a profile of a human, but such a method has a disadvantage of large power consumption.

In order to reduce power consumption, a distance sensor is sometimes used for detecting whether or not a human is using the computer. A current method is to install a plurality of distance sensors on a display screen and a keyboard of the computer and a tabletop respectively. A host device determines whether or not a user is present in front of the computer according to distance information of a plurality of pixels obtained by the distance sensors.

However, distance sensors tend to consume large power when working at the same time. In addition, when there are many objects near the computer, an object detected by the distance sensor may not be the user, which may lead to a misjudgment of the computer.

SUMMARY OF THE DISCLOSURE

In response to the above-referenced technical inadequacies, the present disclosure provides a training system and a training method for a human-presence detection model.

In order to solve the above-mentioned problems, one of the technical aspects adopted by the present disclosure is to provide a training system for a human-presence detection model. The training system includes a distance sensor, a temperature sensor and a host device. The host device is electrically connected to the distance sensor and the temperature sensor. The host device obtains a plurality of training samples by the distance sensor and the temperature sensor. Each of the training samples includes distance data and temperature data. The host device divides the plurality of training samples into a first data cluster and a second data cluster according to whether or not an input interface of the host device is in a used state. The first data cluster corresponds to the used state. The host device marks the first data cluster as a human-presence cluster. The host device selects a sub-cluster from the second data cluster. A center point of the sub-cluster corresponds to a maximum distance value and a minimum temperature value. The host device marks the sub-cluster as a human-absence cluster. The host device performs machine learning for the human-presence cluster and the human-absence cluster to generate the human-presence detection model.

In order to solve the above-mentioned problems, another one of the technical aspects adopted by the present disclosure is to provide a training method for a human-presence detection model. The training method includes: obtaining a plurality of training samples; dividing the plurality of training samples into a first data cluster and a second data cluster according to whether or not an input interface of the host device is in a used state; marking the first data cluster as a human-presence cluster; selecting a sub-cluster from the second data cluster; marking the sub-cluster as a human-absence cluster; and performing machine learning for the human-presence cluster and the human-absence cluster to generate the human-presence detection model. The first data cluster corresponds to the used state. Each of the training samples includes distance data and temperature data. A center point of the sub-cluster corresponds to a maximum distance value and a minimum temperature value.

Therefore, in the training system and the training method provided by the present disclosure, the human-presence detection model can provide more accurate detection results. In addition, because the distance data used for training the human-presence detection model is only a single pixel, power consumption for training the human-presence detection model can be reduced.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
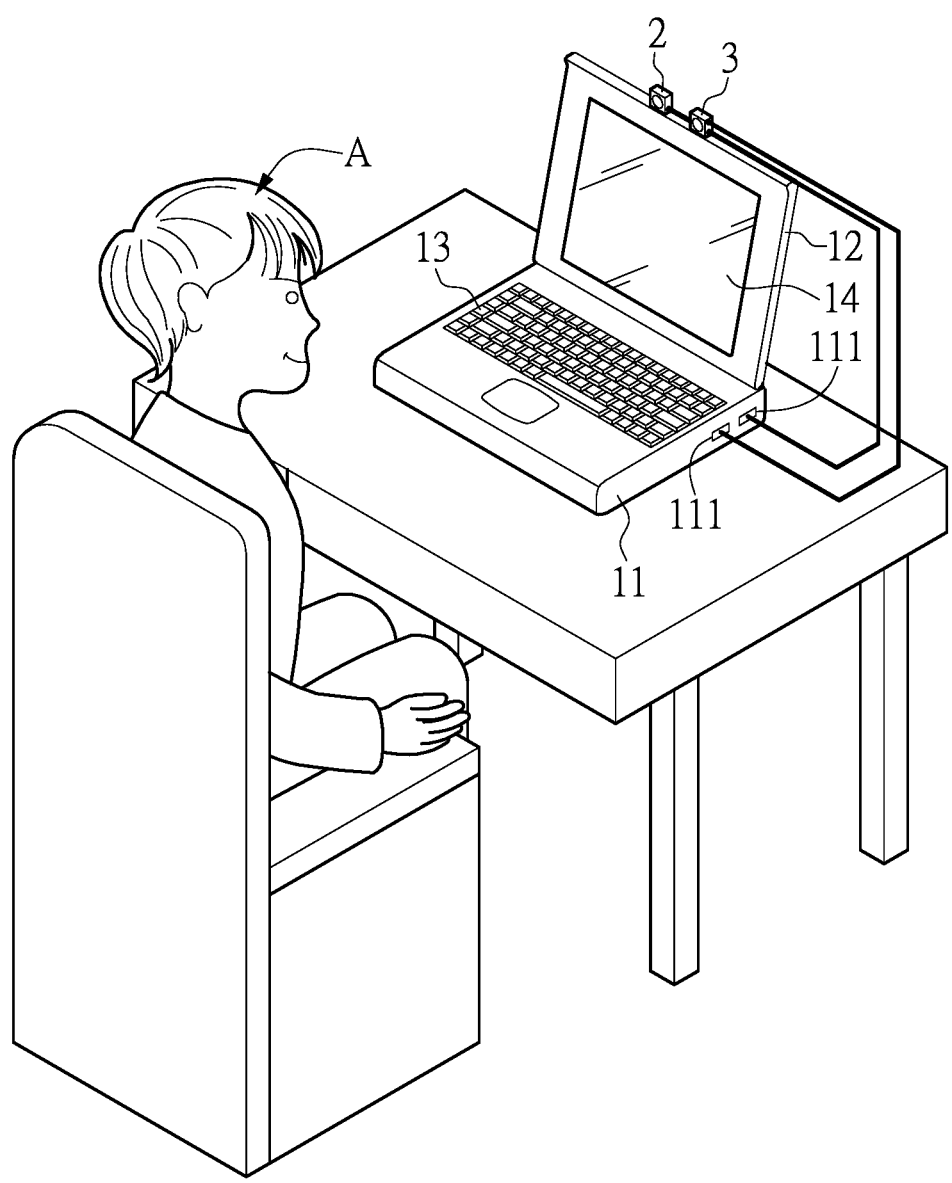
FIG. 1 is a schematic view of a training system for a human-presence detection model according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like. In addition, the term "connect" in the context of the present disclosure means that there is a physical connection between two elements, and the two elements are directly or indirectly connected.

FIG. 1 is a schematic view of a training system for a human-presence detection model according to one embodiment of the present disclosure. The training system includes, for example, a host device 1, a distance sensor 2, and a temperature sensor 3. The host device 1 is, for example, a notebook computer, but is not limited thereto. The host device 1 includes, for example, a first casing 11, a second casing 12, an input interface 13, and a display screen 14. The second casing 12 is movably assembled to the first casing 11. The input interface 13 and the display screen 14 are respectively disposed on the first casing 11 and the second casing 12. The input interface 13 is, for example, a keyboard, but the present disclosure is not limited thereto.

The distance sensor 2 and the temperature sensor 3 are, for example, disposed on the second casing 12 and above the display screen 14. One side of the first casing 11 is provided with two connection ports 111, and the distance sensor 2 and the temperature sensor 3 are respectively electrically connected to the two connection ports 111 of the host device 1. The distance sensor 2 and the temperature sensor 3 are, for example, an infrared time-of-flight sensor and a thermopile sensor respectively, but the present disclosure is not limited thereto.

Figure 2:
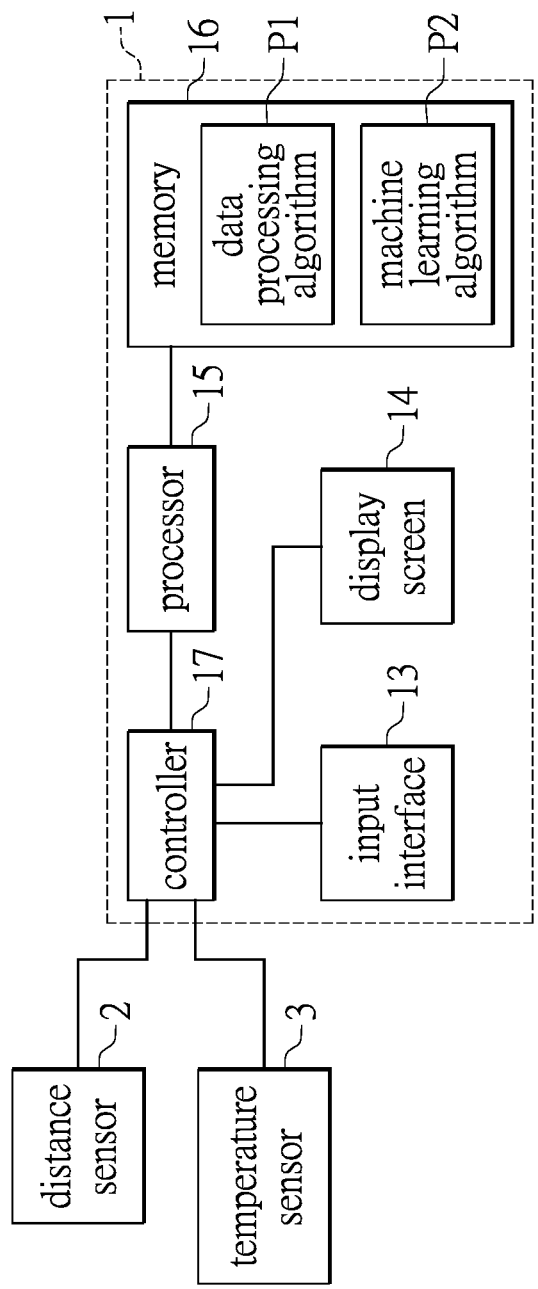
FIG. 2 is a functional block diagram of the training system according to one embodiment of the present disclosure.

FIG. 2 is a functional block diagram of the training system according to one embodiment of the present disclosure. Referring to FIG. 2, the host device 1 further includes a processor 15, a memory 16, and a controller 17. The processor 15 is electrically connected to the memory 16, the controller 17, the distance sensor 2, and the temperature sensor 3. The controller 17 is electrically connected to the input interface 13 and the display screen 14. The memory 16 stores a data processing algorithm P1 and a machine learning algorithm P2.

The processor 15 confirms that the input interface 13 is in a used state or an unused state by the controller 17. The processor 15 obtains a plurality of training samples by the distance sensor 2 and the temperature sensor 3. After the processor 15 obtains the plurality of training samples, the processor 15 executes the data processing algorithm P1 of the memory 16 for grouping and marking the plurality of training samples. After the plurality of training samples is grouped and marked, the processor 15 executes the machine learning algorithm P2 for performing machine learning on the grouped and marked training samples to generate a human-presence detection model. The way that the training samples are grouped and marked will be described later.

Figure 3A:
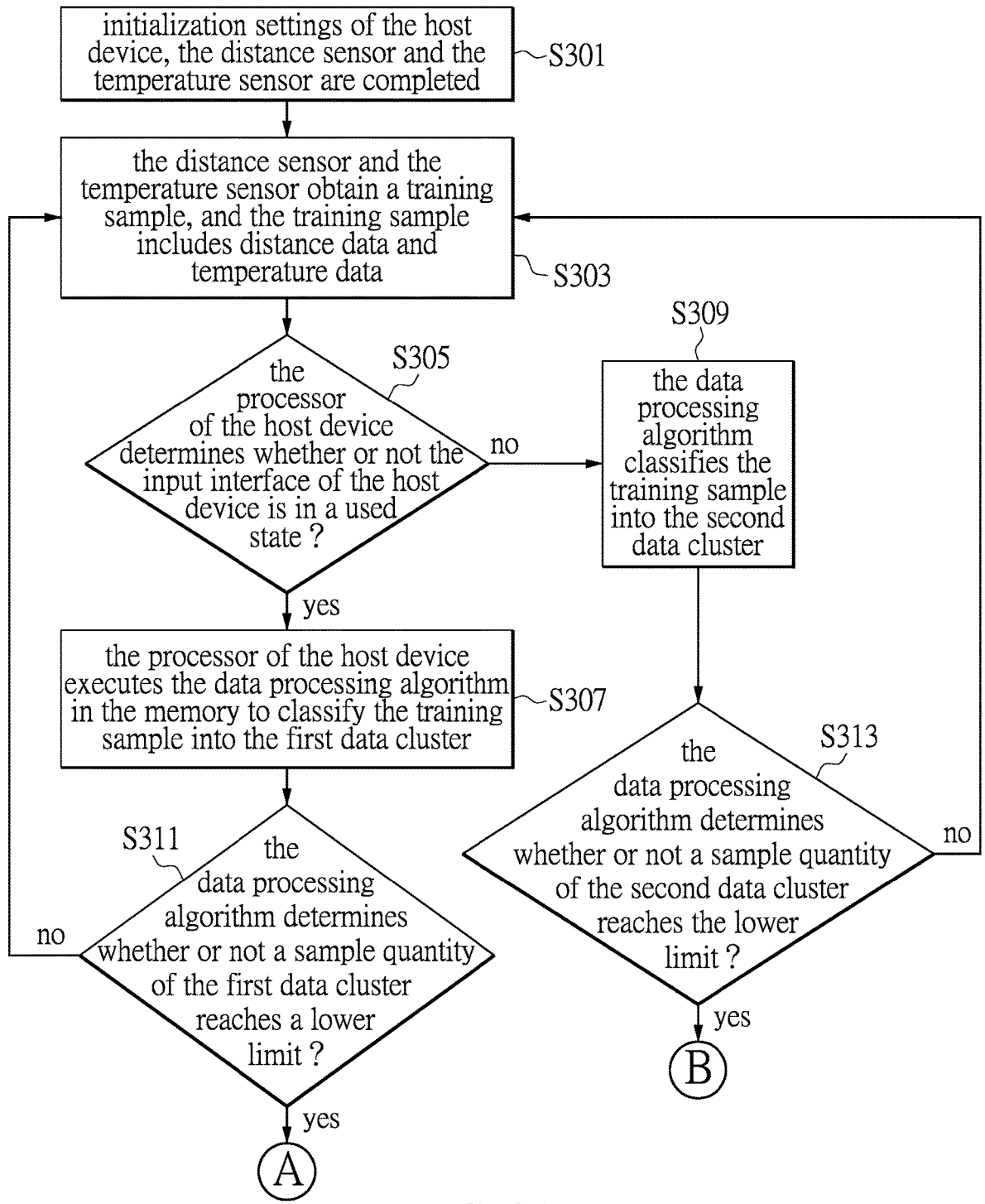
FIG. 3A and FIG. 3B are flowcharts of a training method for the human-presence detection model according to a first embodiment of the present disclosure.
Figure 3B:
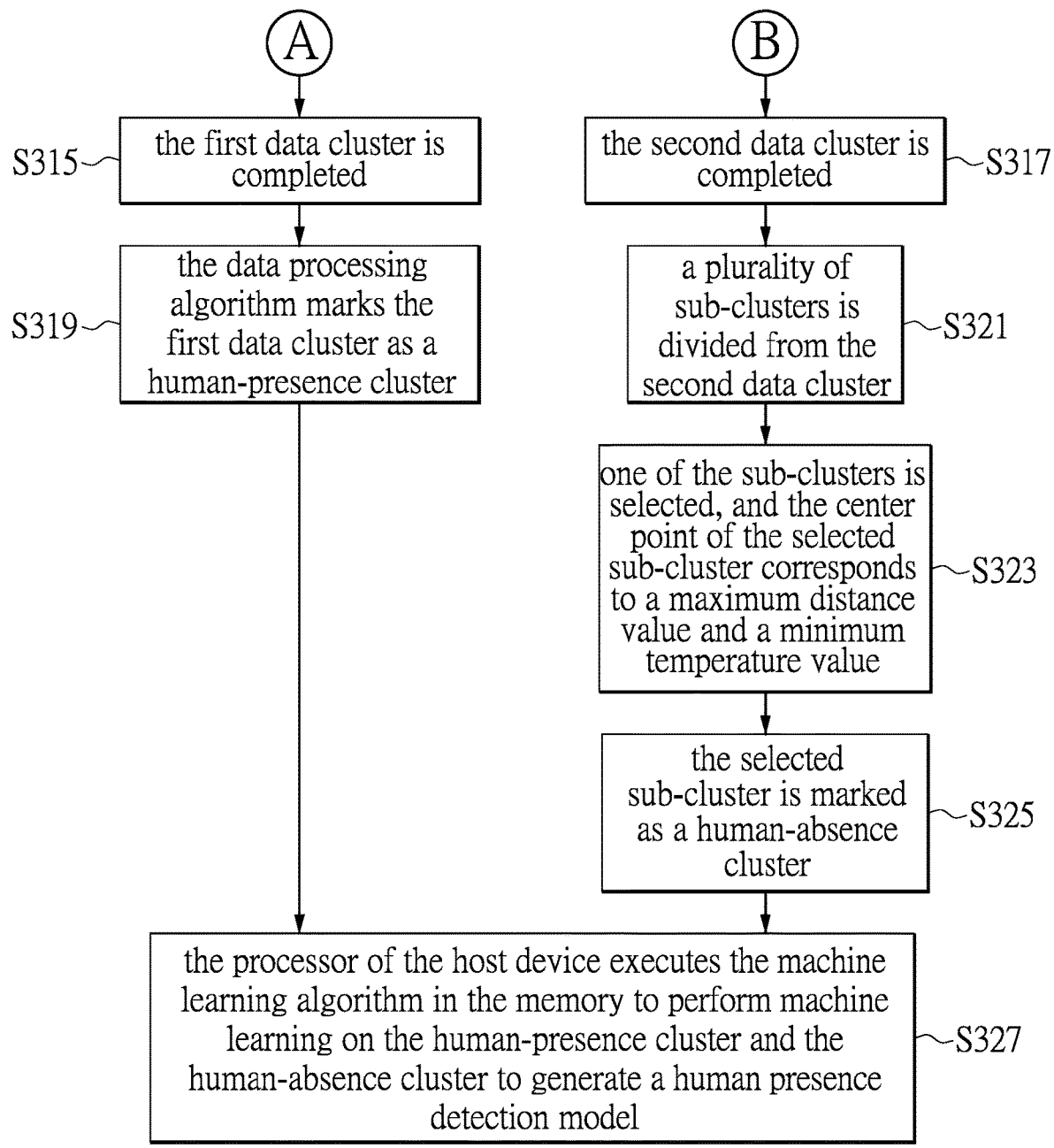

FIG. 3A and FIG. 3B are flowcharts of a training method for the human-presence detection model according to a first embodiment of the present disclosure. Referring to FIG. 3A, in step S301, initialization settings of the host device 1, the distance sensor 2 and the temperature sensor 3 are completed. In step S303, the distance sensor 2 and the temperature sensor 3 obtain a training sample. The training sample includes distance data and temperature data.

Figure 4A:
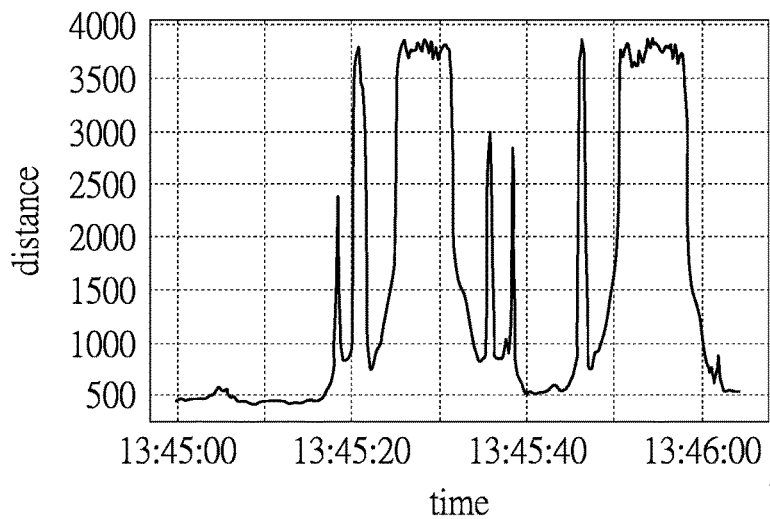
FIG. 4A is a waveform diagram illustrating one example of a distance sensor.
Figure 4B:
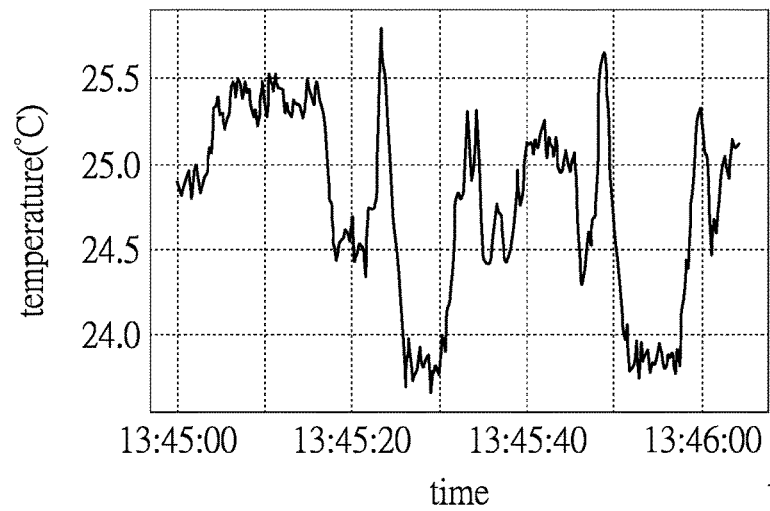
FIG. 4B is a waveform diagram illustrating one example of a temperature sensor.

FIG. 4A is a waveform diagram illustrating one example of a distance sensor, and FIG. 4B is a waveform diagram illustrating one example of a temperature sensor. Referring to FIG. 4A and FIG. 4B, the distance sensor 2 collects distance data every predetermined period, and the temperature sensor 3 collects temperature data every predetermined period. Each of training samples includes distance data and temperature data. After a plurality of predetermined periods, the host device 1 obtains a plurality of training samples by the distance sensor 2 and the temperature sensor 3.

Referring to FIG. 3A, step S305 is performed after step S303. In step S305, the processor 15 of the host device 1 determines whether or not the input interface 13 of the host device 1 is in a used state. If the input interface 13 is in the used state, step S307 is performed after step S305. If the input interface 13 is not in the used state, step S309 is performed after step S305. In detail, after the host device 1 obtains the training sample, the host device 1 determines whether or not the input interface 13 is in the used state or in an unused state at the time point the host device 1 obtains the training sample.

Figure 4C:
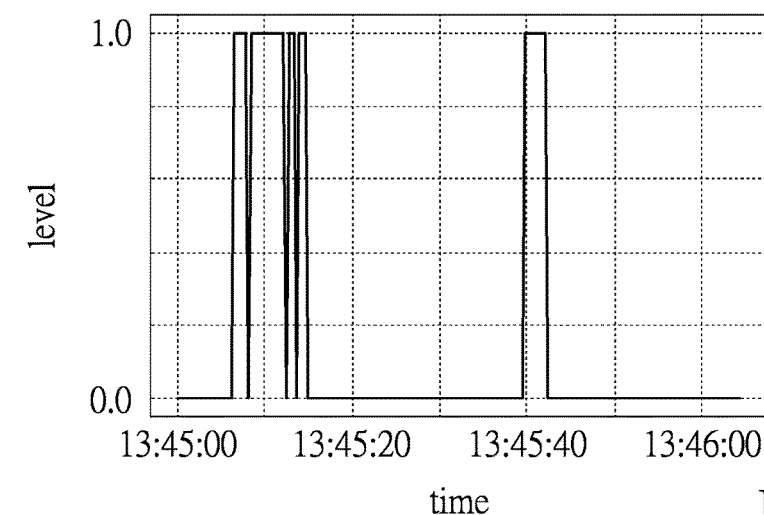
FIG. 4C is a waveform diagram illustrating one example of an input interface of a host device.

FIG. 4C is a waveform diagram illustrating one example of an input interface of a host device. Referring to FIG. 4C, when the input interface 13 of the host device 1 is in the used state, the input interface 13 has a high level signal. On the contrary, when the input interface 13 of the host device 1 is not in the used state, the input interface 13 has a low level signal.

Referring to FIG. 3A, in step S307, the processor 15 of the host device 1 executes the data processing algorithm P1 in the memory 16 to classify the training sample into the first data cluster. In step S309, the data processing algorithm P1 classifies the training sample into the second data cluster.

Referring to FIG. 3A, step S311 is performed after step S307. In step S311, the data processing algorithm P1 determines whether or not a sample quantity of the first data cluster reaches a lower limit.

Referring to FIG. 3A, step S313 is performed after step S309. In step S313, the data processing algorithm P1 determines whether or not a sample quantity of the second data cluster reaches the lower limit.

Referring to FIG. 3A, when the sample quantity of the first data cluster reaches the lower limit, step S315 is performed after step S311. For example, there may be one hundred training samples in the first data cluster and the lower limit is one hundred. When the sample quantity of the first data cluster does not reach the lower limit, the training method returns to step S303. For example, there may be one hundred training samples in the second data cluster and the lower limit is one hundred. In step S315, the first data cluster is completed.

Referring to FIG. 3A, when the sample quantity of the second data cluster reaches the lower limit, step S317 is performed after step S313. When the sample quantity of the second data cluster does not reach the lower limit, the training method returns to step S303. In step S317, the second data cluster is completed.

For example, a default lower limit of the data processing algorithm P1 is 100, so the number of training samples in the first data cluster and the number of training samples in the second data cluster must be at least 100.

Step S319 is performed after step S315. In step S319, the data processing algorithm P1 marks the first data cluster as a human-presence cluster.

Referring to FIG. 3B, step S321 is performed after step S317. In step S321, a plurality of sub-clusters is divided from the second data cluster. A central point of each of sub-clusters corresponds to a distance value and a temperature value. In step S323, one of the sub-clusters is selected, and the center point of the selected sub-cluster corresponds to a maximum distance value and a minimum temperature value. In step S325, the selected sub-cluster is marked as a human-absence cluster.

Figure 5:
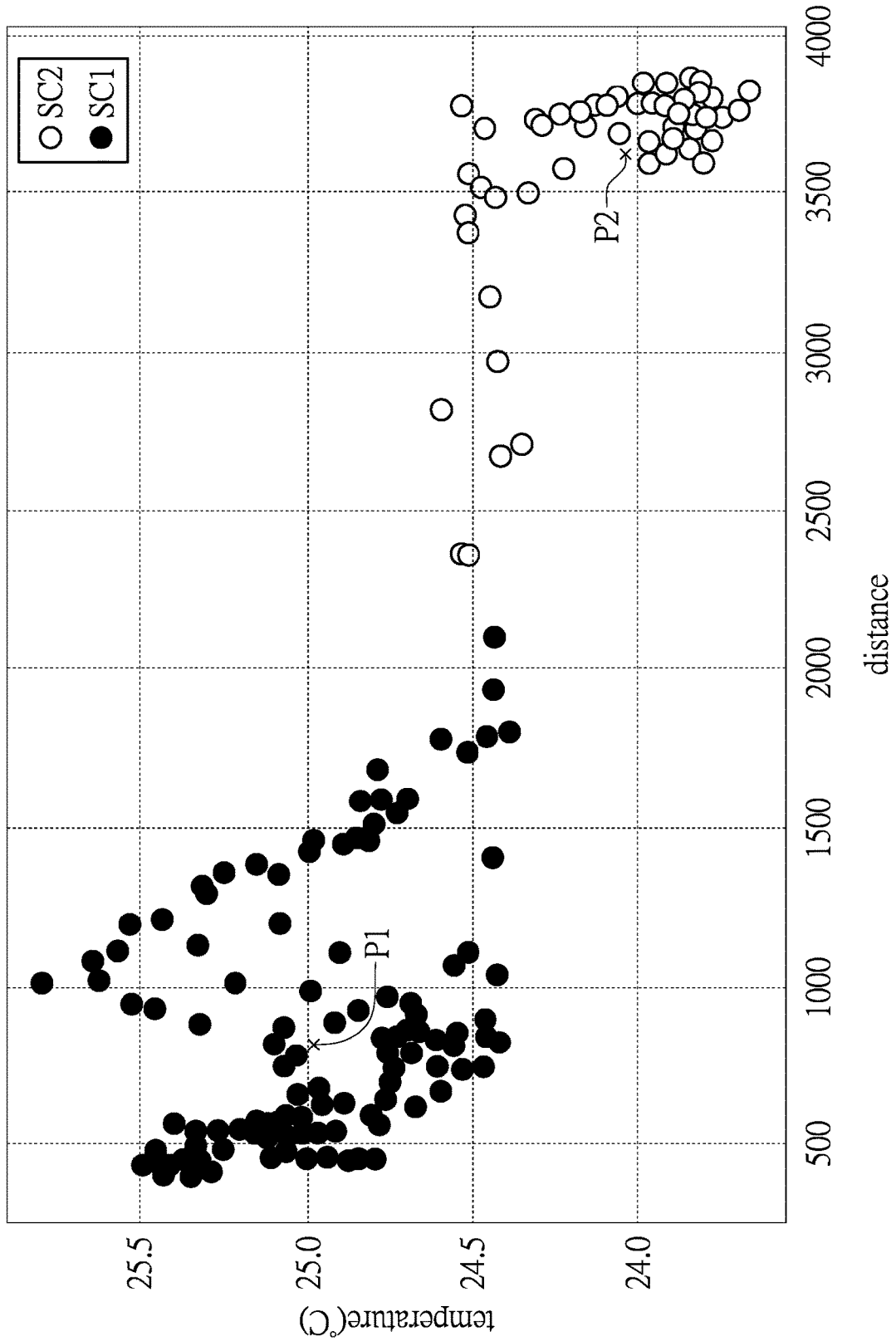
FIG. 5 is a schematic view illustrating one example for a process of selecting a sub-cluster with a maximum distance value and a minimum temperature value from a second data cluster.

FIG. 5 is a schematic view illustrating one example for a process of selecting a sub-cluster with a largest distance and a smallest temperature from a second data cluster. Referring to FIG. 5, the second data cluster can be divided into a first sub-cluster SC1 and a second sub-cluster SC2. A first center point P1 of the first sub-cluster SC1 corresponds to a first distance and a first temperature. A second center point P2 of the second sub-cluster SC2 corresponds to a second distance and a second temperature. Since the second distance is greater than the first distance and the second temperature is less than the first temperature, the host device 1 marks the second sub-cluster SC2 as a human-absence cluster.

Referring to FIG. 3B, after step S319 and step S325, the training method proceeds to step S327. In step S327, the processor 15 of the host device 1 executes the machine learning algorithm P2 in the memory 16 to perform machine learning on the human-presence cluster and the human-absence cluster to generate a human presence detection model.

Figure 6:
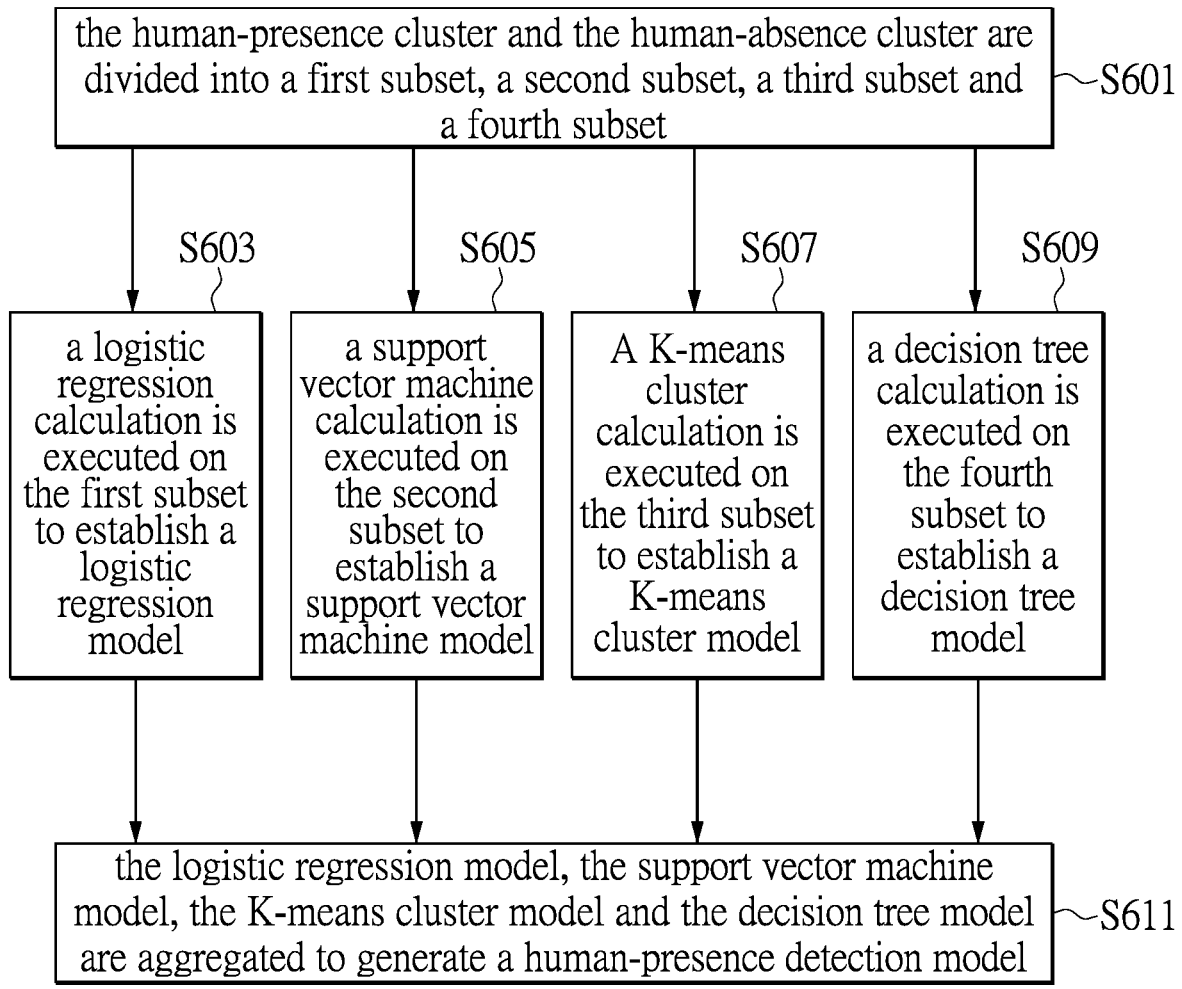
FIG. 6 is a flowchart of one example of a method for executing machine learning for a human-presence cluster and a human-absence cluster of FIG. 3B.

FIG. 6 is a flowchart of one example of a method for executing machine learning for the human-presence cluster and the human-absence cluster of FIG. 3B. In step S601, the human-presence cluster and the human-absence cluster are divided into a first subset, a second subset, a third subset and a fourth subset. In step S603, a logistic regression calculation is executed on the first subset to establish a logistic regression model. In step S605, a support vector machine calculation is executed on the second subset to establish a support vector machine model. In step S607, A K-means cluster calculation is executed on the third subset to establish a K-means cluster model. In step S609, a decision tree calculation is executed on the fourth subset to establish a decision tree model. In step S611, the logistic regression model, the support vector machine model, the K-means cluster model and the decision tree model are aggregated to generate a human-presence detection model. The machine learning algorithm described above is only one example, and the present disclosure is not limited thereto.

After the human-presence detection model is generated, the host device 1 collects a plurality of test samples by the distance sensor 2 and the temperature sensor 3. The plurality of test samples is sequentially inputted into the human-presence detection model in order to determine whether or not a detection result outputted by the human-presence detection model is consistent with an actual situation, which decides whether or not to mark the test samples for retraining the human-presence detection model.

Figure 7:
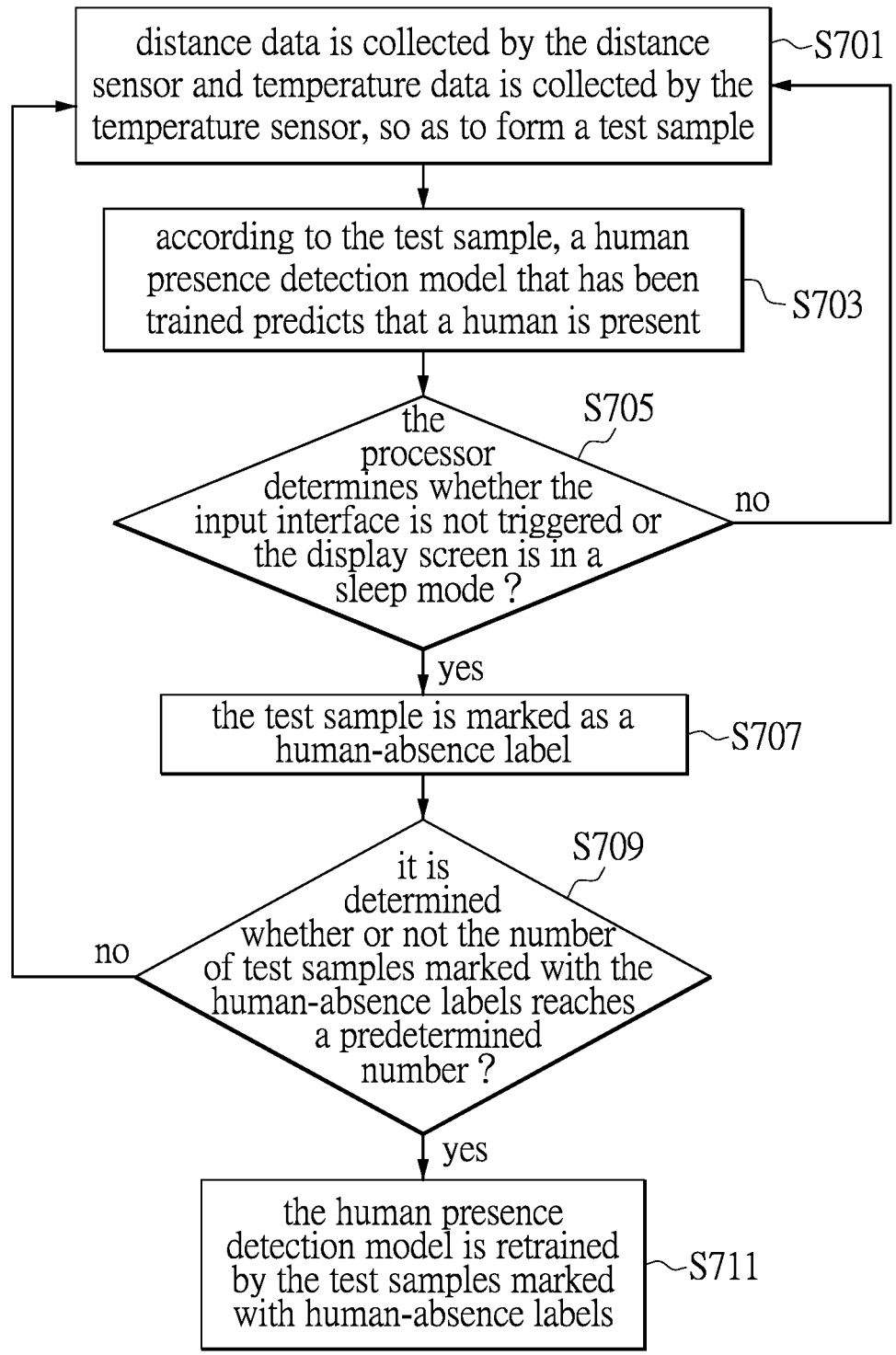
FIG. 7 is a flowchart of one example of a method for retraining the human-presence detection model.

FIG. 7 is a flowchart of one example of a method for retraining the human-presence detection model. Referring to FIG. 7, in step S701, distance data is collected by the distance sensor 2 and temperature data is collected by the temperature sensor 3, so as to form a test sample. In step S703, according to the test sample, a human presence detection model that has been trained predicts that a human is present. In step S705, the processor 15 determines whether the input interface 13 is not triggered or the display screen 14 is in a sleep mode. If the input interface 13 is not triggered or the display screen 14 is in the sleep mode, step S707 is performed after step S705. If the input interface 13 is triggered or the display screen 14 is in a work mode, the method returns to step S701. In step S707, the test sample is marked as a human-absence label. In step S709, it is determined whether or not the number of test samples marked with the human-absence labels reaches a predetermined number. If so, step S711 is performed following step S709. If not, the method returns to step S701. In step S711, the human presence detection model is retrained by the test samples marked with human-absence labels.

Figure 8:
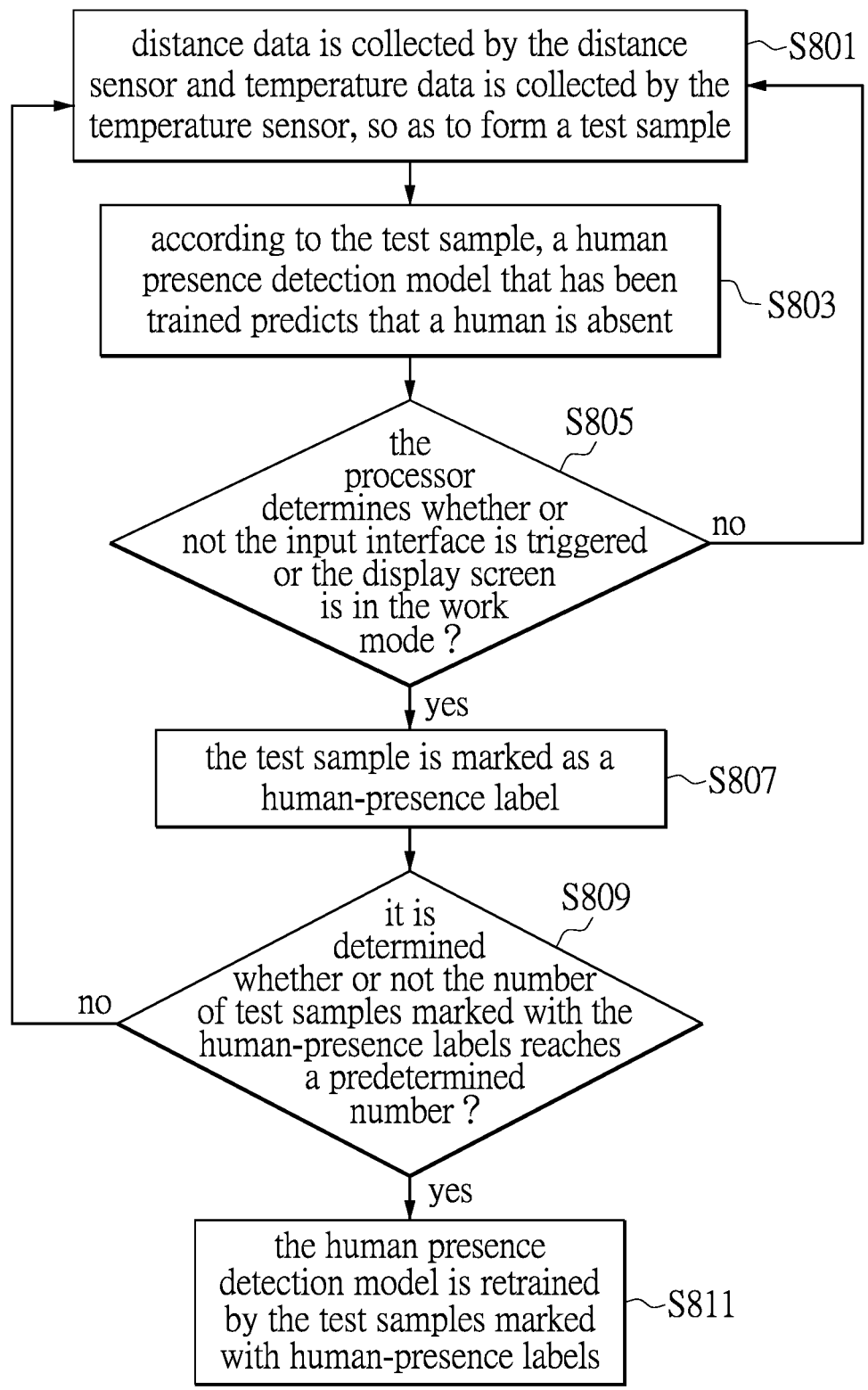
FIG. 8 is a flowchart of another example of a method for retraining the human-presence detection model.

FIG. 8 is a flowchart of another example of a method for retraining the human-presence detection model. Referring to FIG. 8, in step S801, distance data is collected by the distance sensor 2 and temperature data is collected by the temperature sensor 3, so as to form a test sample. In step S803, according to the test sample, a human presence detection model that has been trained predicts that a human is absent. In step S805, the processor 15 determines whether or not the input interface 13 is triggered or the display screen 14 is in the work mode. If the input interface 13 is triggered or the display screen 14 is in the work mode, step S807 is performed after step S805. If the input interface 13 is not triggered or the display screen 14 is in the sleep mode, the method returns to step S801. In step S807, the test sample is marked as a human-presence label. In step S809, it is determined whether or not the number of test samples marked with the human-presence labels reaches a predetermined number. If so, step S809 proceeds to step S811. If not, the method returns to step S801. In step S811, the human presence detection model is retrained by the test samples marked with human-presence labels.

Figure 9A:
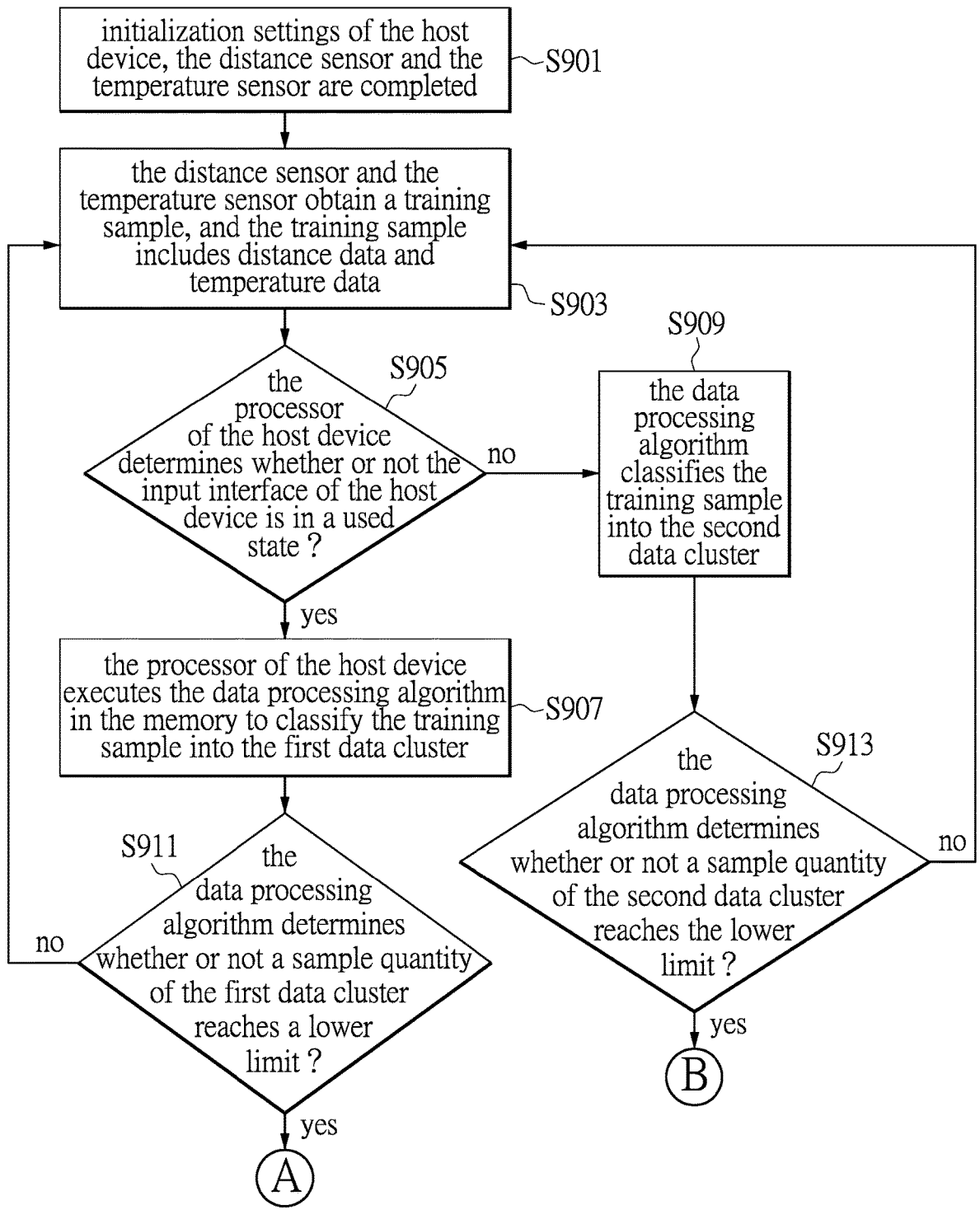
FIG. 9A and FIG. 9B are flowcharts of the training method for the human-presence detection model according to a second embodiment of the present disclosure.
Figure 9B:
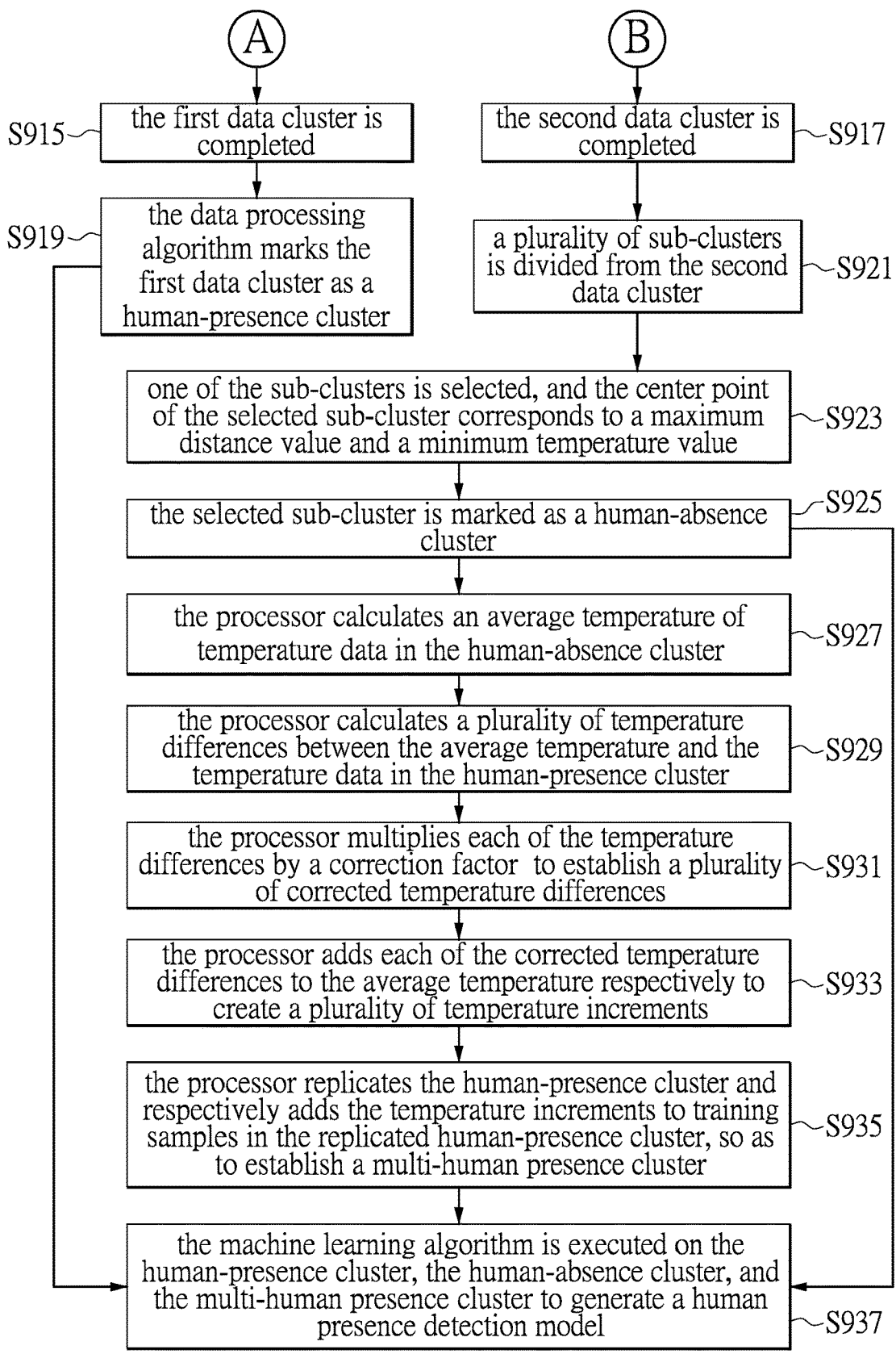

FIG. 9A and FIG. 9B are flowcharts of the training method for the human-presence detection model according to a second embodiment of the present disclosure. Steps S901 to S925 of FIG. 9A and FIG. 9B are the same as steps S301 to S325 of FIG. 3. Different from the training method of FIG. 3, the training method of FIG. 9B further includes steps S927 to S937.

Step S927 follows step S925. In step S927, the processor 15 calculates an average temperature of temperature data in the human-absence cluster.

In step S929, the processor 15 calculates a plurality of temperature differences between the average temperature and the temperature data in the human-presence cluster. Specifically, the average temperature is subtracted from each of the temperature data of the human-presence cluster to generate the plurality of temperature differences.

In step S931, the processor 15 multiplies each of the temperature differences by a correction factor (e.g. of 2) to establish a plurality of corrected temperature differences. In step S933, the processor 15 adds each of the corrected temperature differences to the average temperature respectively to create a plurality of temperature increments. In step S935, the processor 15 replicates the human-presence cluster and respectively adds the temperature increments to training samples in the replicated human-presence cluster, so as to establish a multi-human presence cluster. After step S919, step S925 and step S935, the training method proceeds to step S937. In step S937, the machine learning algorithm P2 is executed on the human-presence cluster, the human-absence cluster, and the multi-human presence cluster to generate a human presence detection model.

Figure 10:
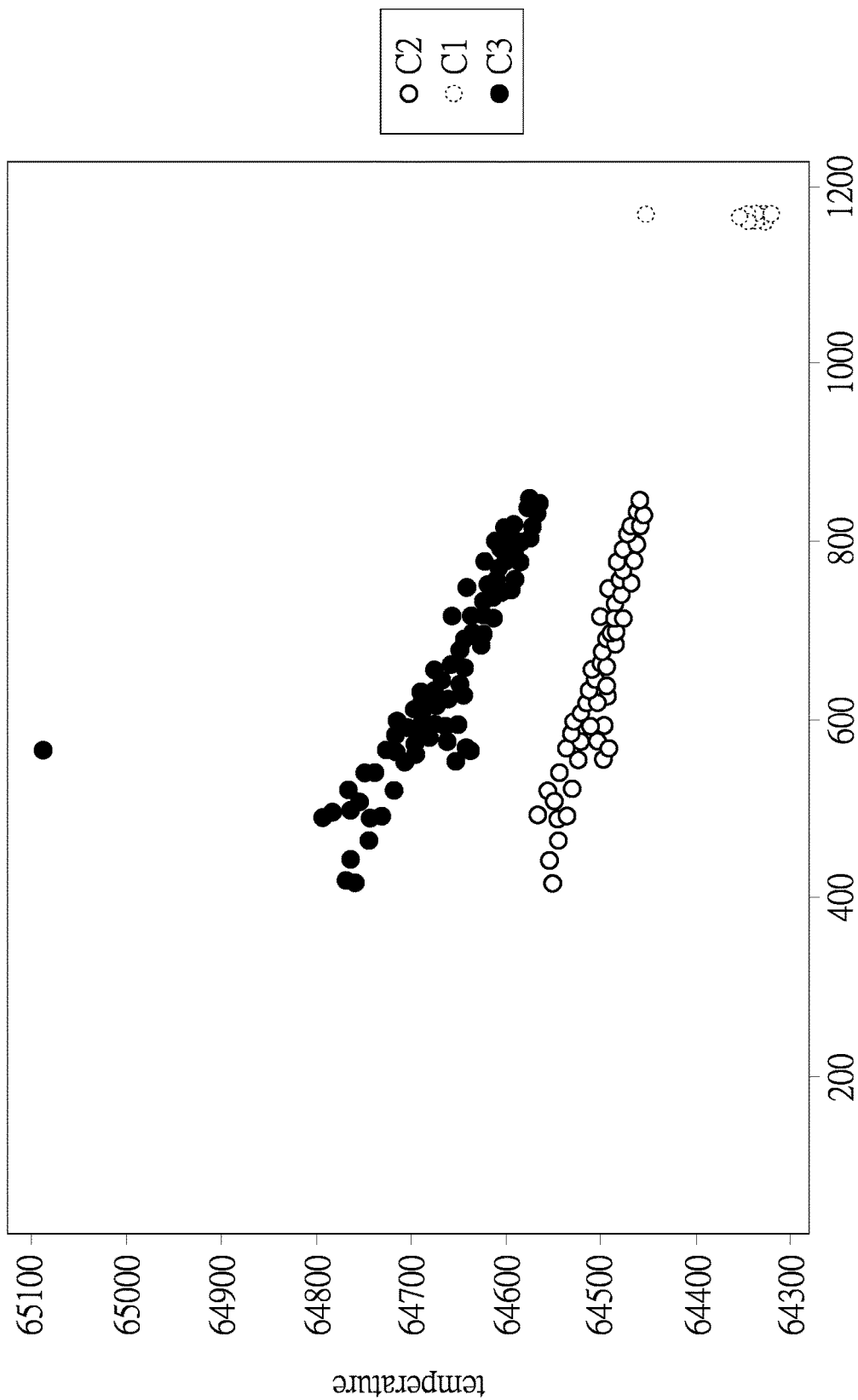
FIG. 10 is a schematic view illustrating one example of the human-presence cluster, the human-absence cluster, and a multi-human presence cluster.

FIG. 10 is a schematic view illustrating one example of the human-presence cluster, the human-absence cluster, and a multi-human presence cluster. Referring to FIG. 10, the first data cluster C1 is the human-absence cluster, and the second data cluster C2 is the human-presence cluster. A distance value corresponding to a center point of the first data cluster C1 is obviously greater than that of the second data cluster C2, and a temperature value corresponding to the center point of the first data cluster C1 is obviously greater than that of the second data cluster C2. The third data cluster C3 is multi-human presence cluster. The third data cluster C3 is a data cluster established by an upward shift of the second data cluster C2 along a direction of a temperature axis. Therefore, the distance data of the third data cluster C3 are the same as the distance data of the second data cluster C2. A temperature increment exists between each temperature datum of the third data cluster C3 and each temperature datum of the second data cluster C2.

Figure 11:
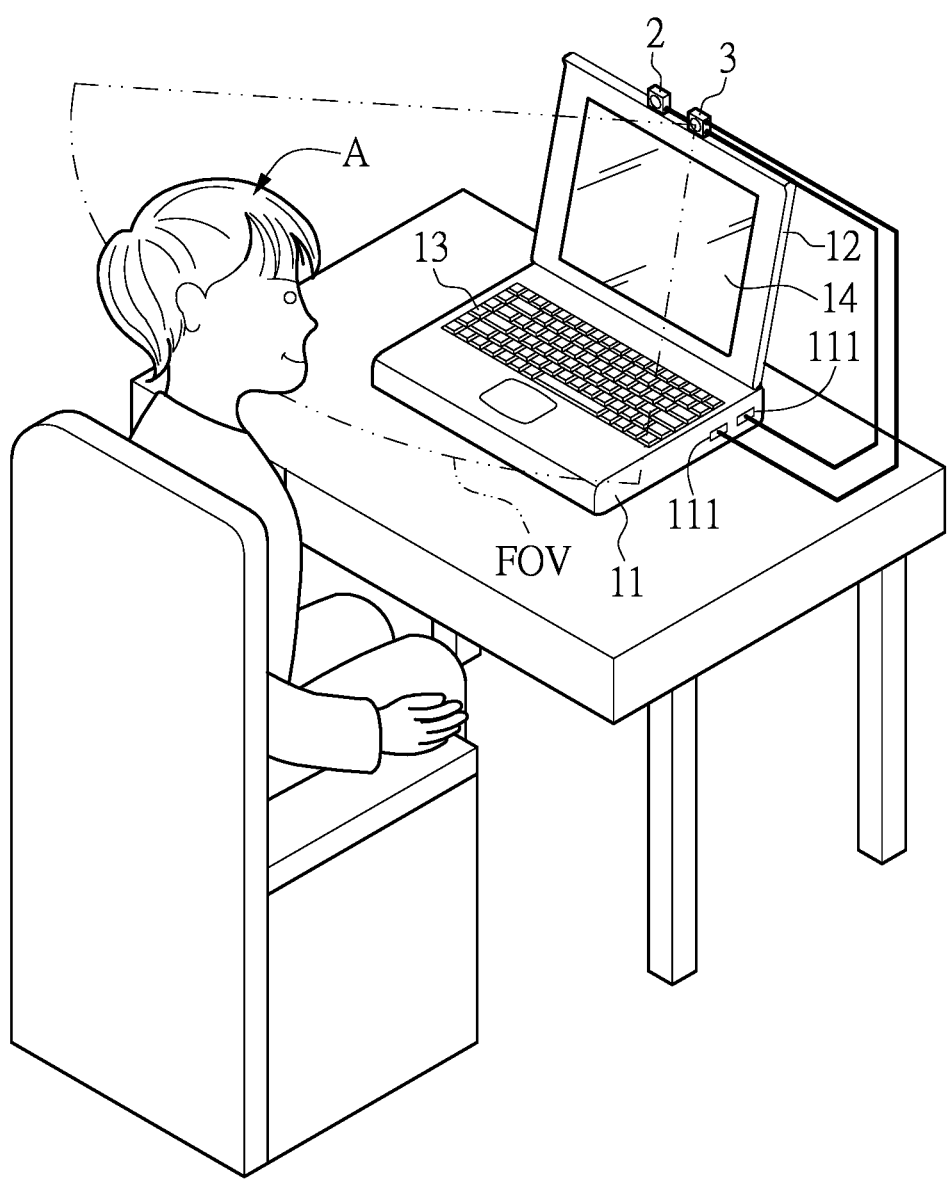
FIG. 11 is a schematic view illustrating a single person being within a field of view of the temperature sensor.
Figure 12:
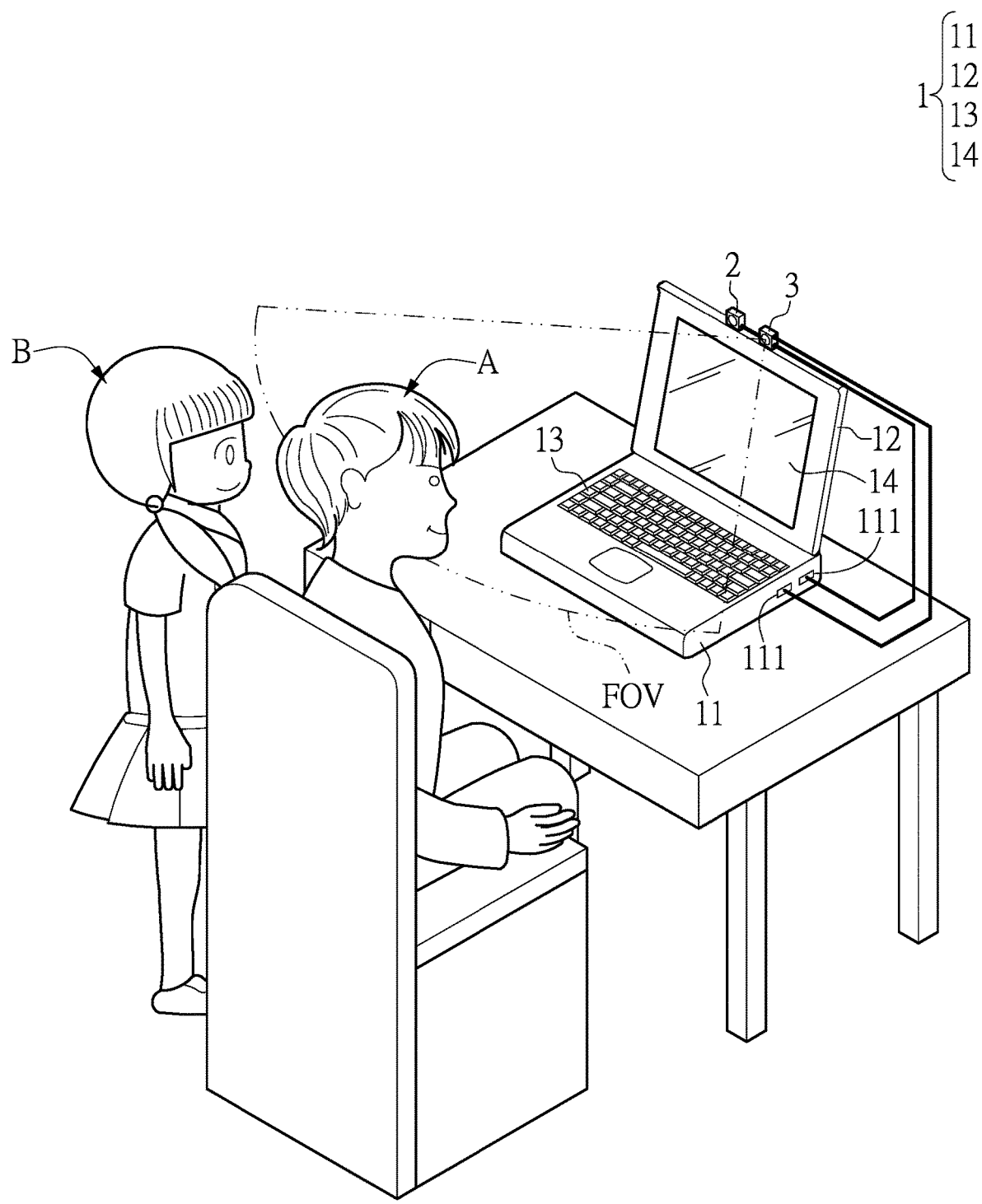
FIG. 12 is a schematic view illustrating multiple people being within the field of view of the temperature sensor.

FIG. 11 is a schematic view illustrating a single person being within a field of view of the temperature sensor. FIG. 12 is a schematic view illustrating multiple people being within the field of view of the temperature sensor. Referring to FIG. 11, a person A is located in a field of view (FOV) of the temperature sensor 3, and a percentage of the field of view (FOV) that is occupied by the person A is about 50%. Referring to FIG. 12, the person A and a person B are located within the field of view (FOV) of the temperature sensor 3. A percentage of the field of view (FOV) that is occupied by the persons A and B is about 100%.

Figure 13A:
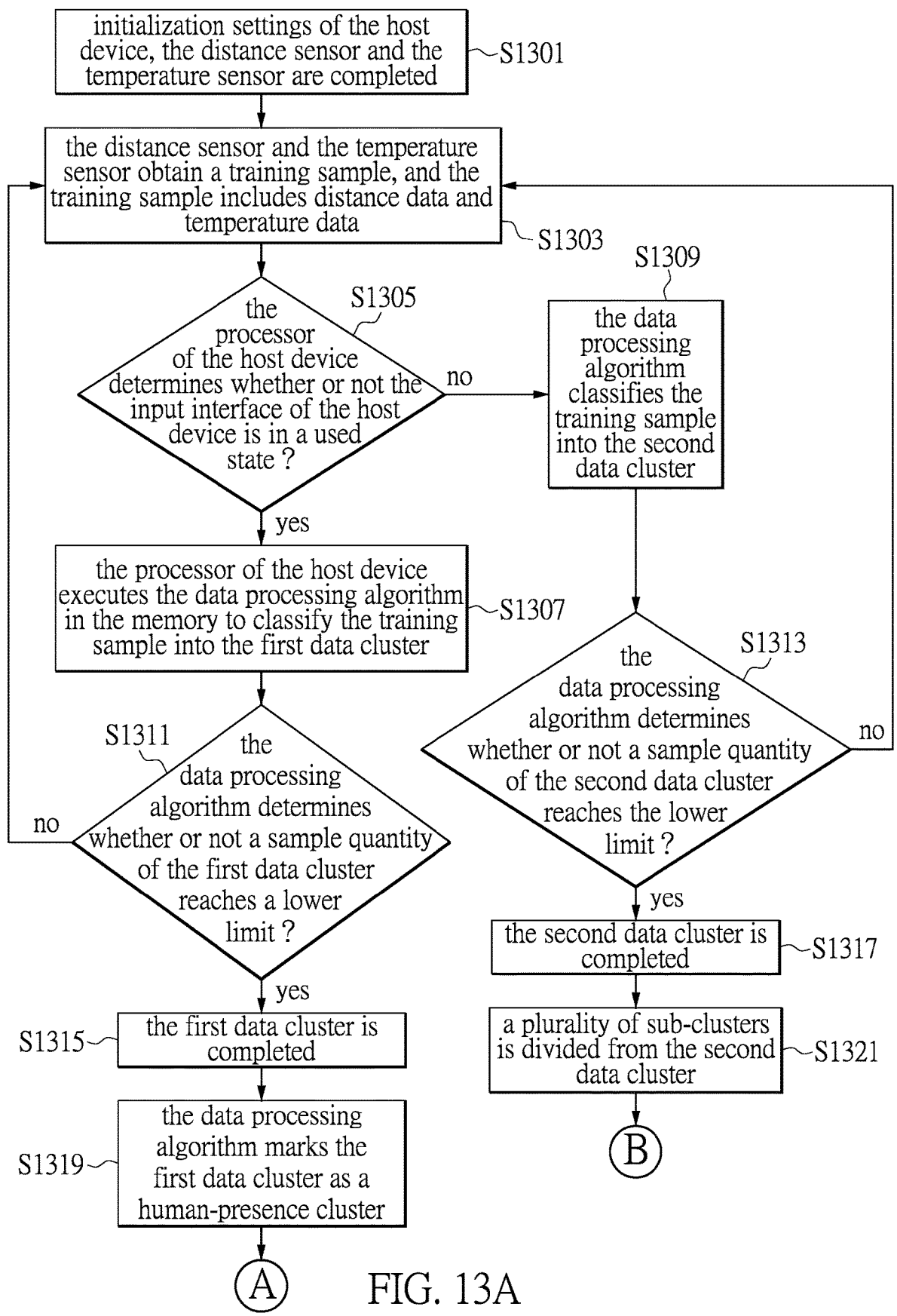
FIG. 13A and FIG. 13B are flowcharts of the training method for the human-presence detection model according to a third embodiment of the present disclosure.
Figure 13B:
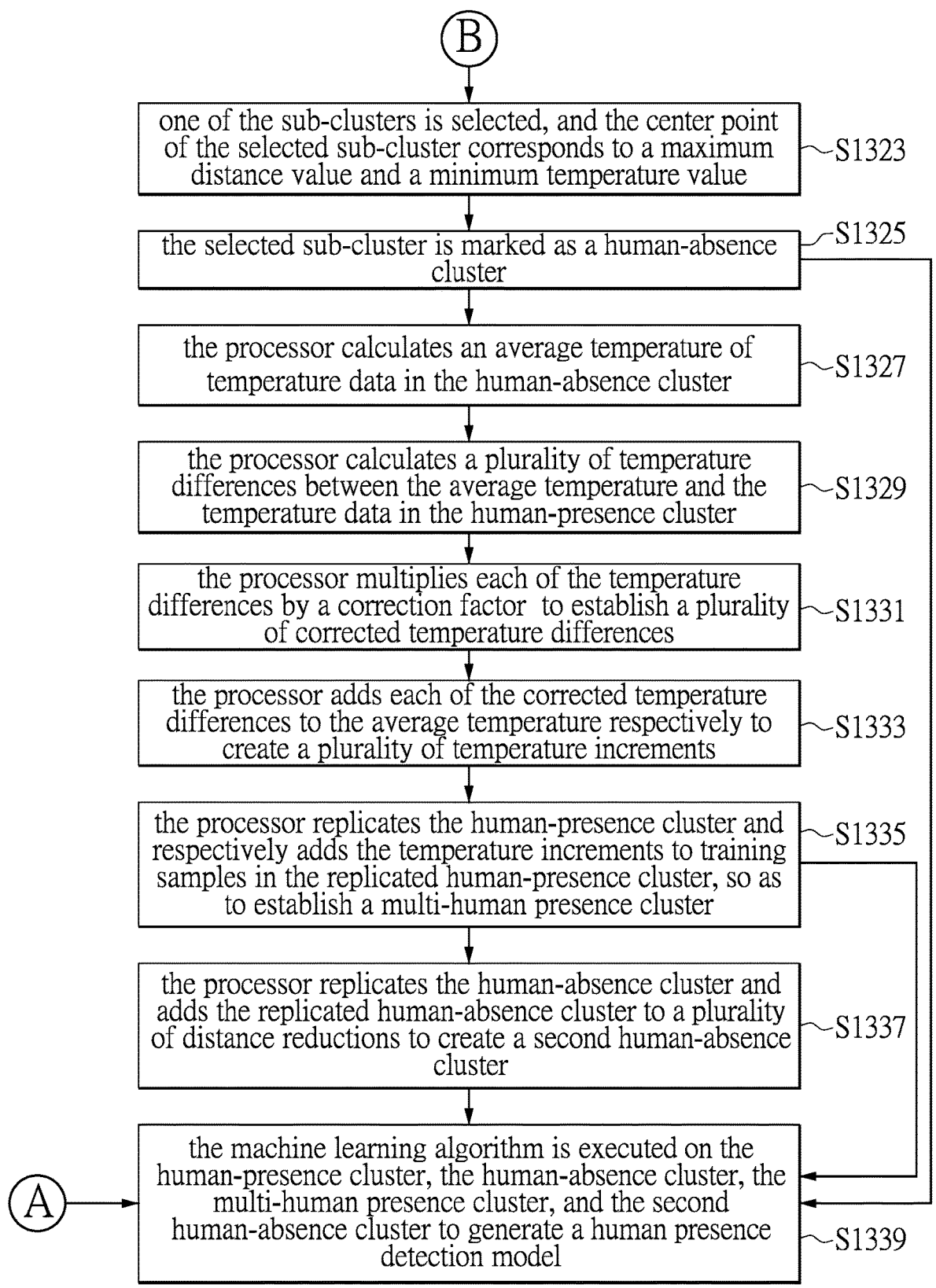

FIG. 13A and FIG. 13B are flowcharts of the training method for the human-presence detection model according to a third embodiment of the present disclosure. Steps S1301 to S1335 of FIG. 13A and FIG. 13B are the same as steps S901 to S935 of FIG. 9A and FIG. 9B. Different from the training method of FIG. 9A and FIG. 9B, the training method of FIG. 13B further includes steps S1337 to S1339.

Step S1337 is performed after step S1325. In step S1337, the processor 15 replicates the human-absence cluster and adds the replicated human-absence cluster to a plurality of distance reductions to create a second human-absence cluster. Step S1339 is performed after step S1319, step S1325, step S1335, and step S1337. In step S1339, the machine learning algorithm P2 is executed on the human-presence cluster, the human-absence cluster, the multi-human presence cluster, and the second human-absence cluster to generate a human presence detection model.

Figure 14:
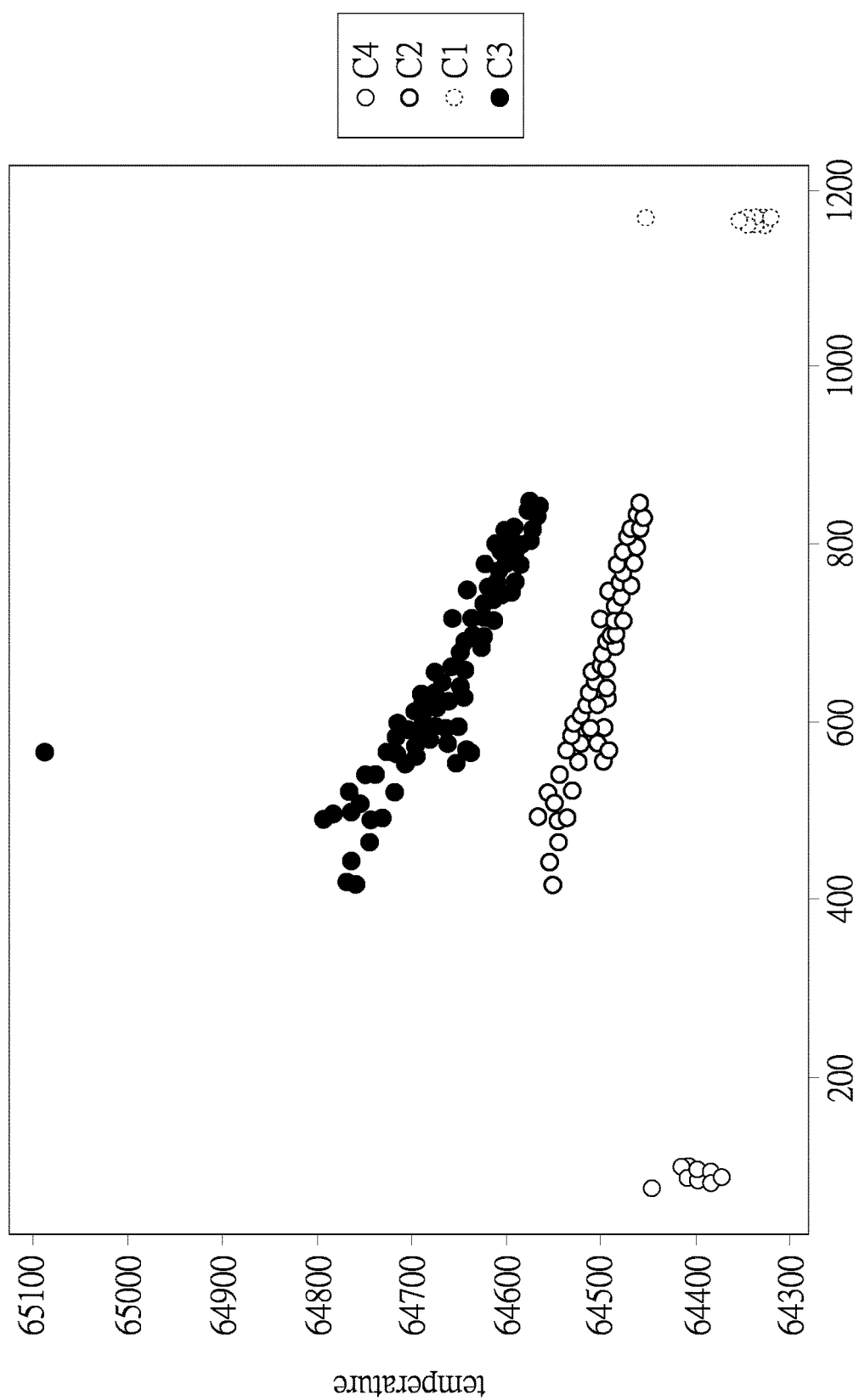
FIG. 14 is a schematic view illustrating one example of the human-presence cluster, the human-absence cluster, the multi-human presence cluster, and a newly created human-absence cluster.

FIG. 14 is a schematic view illustrating one example of the human-presence cluster, the human-absence cluster, the multi-human presence cluster, and a newly created human-absence cluster. Referring to FIG. 14, the first data cluster C1 is the human-absence cluster, the second data cluster C2 is the human-presence cluster, a third data cluster C3 is the multi-human presence cluster, and a fourth data cluster C4 is the second human-absence cluster. The fourth data cluster C4 is a data cluster established by a leftward shift of the first data cluster C1 along a direction of a distance axis. Therefore, the temperature data of the fourth data cluster C4 are the same as the temperature data of the first data cluster C1, and a distance reduction exists between each of the distance data of the forth data cluster C4 and each of the distance data of the first data cluster C1.

Beneficial Effects of the Embodiments

In conclusion, in the training system and the training method provided by the present disclosure, the human-presence detection model can provide more accurate detection results. In addition, because the distance data used for training the human-presence detection model is only a single pixel, power consumption for training the human-presence detection model can be reduced.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A training system for a human-presence detection model comprising:
    a distance sensor;
    a temperature sensor; and
    a host device electrically connected to the distance sensor and the temperature sensor;

wherein the host device obtains a plurality of training samples by the distance sensor and the temperature sensor, each of the training samples includes distance data and temperature data, the host device divides the plurality of training samples into a first data cluster and a second data cluster according to whether or not an input interface of the host device is in a used state, and the first data cluster corresponds to the used state;

wherein the host device marks the first data cluster as a human-presence cluster;

wherein the host device selects a sub-cluster from the second data cluster, a center point of the sub-cluster corresponds to a maximum distance value and a minimum temperature value, and the host device marks the sub-cluster as a human-absence cluster;

wherein the host device performs machine learning for the human-presence cluster and the human-absence cluster to generate the human-presence detection model.

2. The training system according to claim 1, wherein the distance sensor is an infrared time of flight sensor, and the temperature sensor is a thermopile sensor.

3. The training system according to claim 1, wherein the host device includes a processor, a memory, and a controller, the processor is electrically connected to the memory and the controller, the controller is electrically connected to the input interface, and the distance sensor and the temperature sensor are electrically connected to the processor.

4. The training system according to claim 1, wherein the host device calculates an average temperature of the temperature data of the human-absence cluster, the host device subtracts the average temperature from each of the temperature data of the human-presence cluster to generate a plurality of temperature differences, the host device multiplies each of the temperature differences by a correction factor to generate a plurality of corrected temperature differences, the host device adds each of the corrected temperature differences to the average temperature to create a plurality of temperature increments, and the host device replicates the human-presence cluster and adds the replicated human-presence cluster to the temperature increments to create a multi-human presence cluster.

5. The training system according to claim 4, wherein the host device replicates the human-absence cluster and adds the replicated human-absence cluster to a plurality of distance reductions to create a second human-absence cluster.

6. A training method for a human-presence detection model, the training method executed by a distance sensor, a temperature sensor and a host device, the training method comprising:

obtaining a plurality of training samples, wherein each of the training samples includes distance data and temperature data;

dividing the plurality of training samples into a first data cluster and a second data cluster according to whether or not an input interface of the host device is in a used state, wherein the first data cluster corresponds to the used state;

marking the first data cluster as a human-presence cluster;

selecting a sub-cluster from the second data cluster, wherein a center point of the sub-cluster corresponds to a maximum distance value and a minimum temperature value;

marking the sub-cluster as a human-absence cluster; and performing machine learning for the human-presence cluster and the human-absence cluster to generate the human-presence detection model.

7. The training method according to claim 6, wherein the host device calculates an average temperature of the temperature data of the human-absence cluster, the host device subtracts the average temperature from the each of the temperature data of the human-presence cluster to generate a plurality of temperature differences, the host device multiplies each of the temperature differences by a correction factor to generate a plurality of corrected temperature differences, the host device adds each of the corrected temperature differences to the average temperature to create a plurality of temperature increments, and the host device replicates the human-presence cluster and adds the replicated human-presence cluster to the temperature increments to create a multi-human presence cluster.

8. The training method according to claim 7, wherein the host device replicates the human-absence cluster and adds the replicated human-absence cluster to a plurality of distance reductions to create a second human-absence cluster.

9. The training method according to claim 6, further comprising: determining, by the host device, whether or not a sample quantity of the second data cluster is greater than or equal to a lower limit before obtaining the human-absence cluster.

10. The training method according to claim 6, wherein the machine learning that is performed includes: dividing the human-presence cluster and the human-absence cluster into a first subset, a second subset, a third subset and a fourth subset; executing a logistic regression calculation on the first subset to establish a logistic regression model; executing a support vector machine calculation on the second subset to establish a support vector machine model; executing a K-means clustering calculation on the third subset to establish a K-means cluster model; executing a decision tree calculation on the fourth subset to establish a decision tree model; aggregating the logistic regression model, the support vector machine model, the K-means cluster model, and the decision tree model to generate the human-presence detection model.

* * * * *